United States Patent
Honda et al.

(10) Patent No.: US 9,718,734 B2
(45) Date of Patent: Aug. 1, 2017

(54) THERMAL SPRAY MATERIAL

(71) Applicant: KROSAKIHARIMA CORPORATION, Fukuoka (JP)

(72) Inventors: Kazuhiro Honda, Fukuoka (JP); Taijirou Matsui, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 0 days.

(21) Appl. No.: 15/110,141

(22) PCT Filed: Nov. 7, 2014

(86) PCT No.: PCT/JP2014/079584
§ 371 (c)(1),
(2) Date: Jul. 7, 2016

(87) PCT Pub. No.: WO2015/114904
PCT Pub. Date: Aug. 6, 2015

(65) Prior Publication Data
US 2016/0326057 A1    Nov. 10, 2016

(30) Foreign Application Priority Data
Jan. 29, 2014    (JP) .................................. 2014-014601

(51) Int. Cl.
| | | |
|---|---|---|
| *C04B 35/14* | (2006.01) | |
| *C23C 4/06* | (2016.01) | |
| *C01B 33/02* | (2006.01) | |
| *C23C 4/067* | (2016.01) | |
| *C04B 35/622* | (2006.01) | |

(52) U.S. Cl.
CPC .............. *C04B 35/14* (2013.01); *C01B 33/02* (2013.01); *C04B 35/62222* (2013.01); *C23C 4/067* (2016.01); *C04B 2235/3418* (2013.01); *C04B 2235/428* (2013.01)

(58) Field of Classification Search
CPC ..... C04B 35/14; C04B 35/62222; C23C 4/10; C23C 4/11
See application file for complete search history.

(56) References Cited

FOREIGN PATENT DOCUMENTS

| JP | 06199576 | * | 7/1994 |
|---|---|---|---|
| JP | 2005336001 | | 12/2005 |
| JP | 2006098029 | * | 4/2006 |
| JP | 2007284707 | | 11/2007 |
| JP | 4109663 | | 4/2008 |
| JP | 4657172 | | 1/2011 |
| JP | 2012188345 | * | 10/2012 |
| JP | 2013-043141 | | 3/2013 |
| JP | 5671648 | * | 2/2015 |

OTHER PUBLICATIONS

International Preliminary Report on Patentability (including English Translation) dated Aug. 2, 2016 for PCT/JP2014/79584 filed Nov. 7, 2014.
Written Opinion (including English translation) mailed Jan. 27, 2015 for PCT/JP2014/79584 filed Nov. 7, 2014.
English Translation of International Search Report dated Jan. 27, 2015 for PCT/JP2014/79584 filed Nov. 7, 2014.
International Search Report dated Jan. 2015 for PCT/JP2014/79584 filed Nov. 7, 2014.

* cited by examiner

*Primary Examiner* — Karl Group
(74) *Attorney, Agent, or Firm* — Paul D. Bianco; Fleit Gibbons Gutman Bongini & Bianco PL

(57) ABSTRACT

Disclosed is a technique for suppressing a firing property and a dust generating property while improving bondability, in a thermal spray material for use in a thermite spraying process. The thermal spray material comprises a refractory material powder and a metal Si powder and capable of being sprayed onto a target surface using oxygen or oxygen-containing gas as a carrier gas and melt-adhered to the target surface based on heat generated by combustion of the metal Si powder, wherein the metal Si powder is contained in an amount of 10 to 25 mass % with respect to the entire thermal spray material, and wherein the metal Si powder has a median size of 10 μm or less, and contains a fraction having a particle size of 2 μm or less in an amount of 8 mass % or less with respect to the entire metal Si powder.

2 Claims, 1 Drawing Sheet

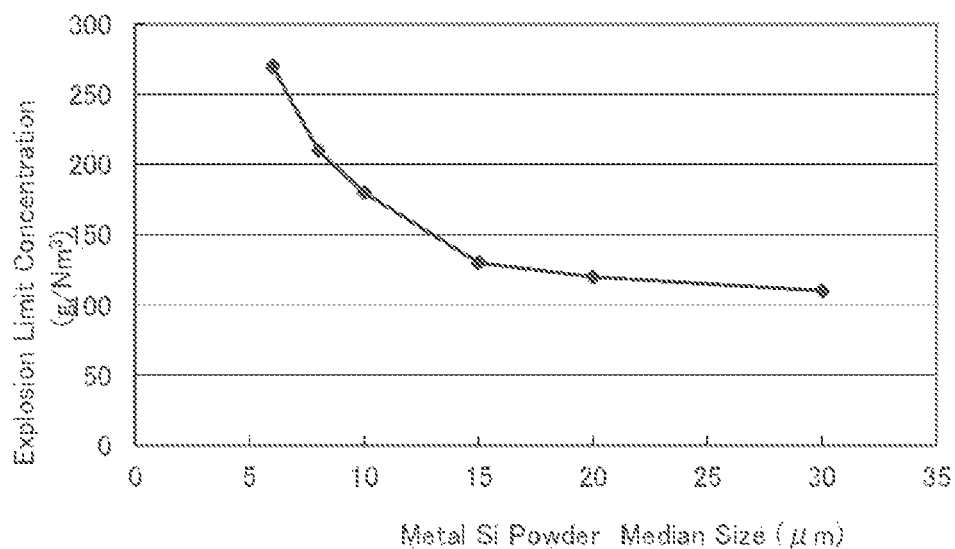

THERMAL SPRAY MATERIAL

TECHNICAL FIELD

The present invention relates to a thermal spray material for use in repair of a kiln wall of an industrial kiln, or the like.

BACKGROUND ART

As one technique for repairing a kiln wall of an industrial kiln, there has been known a thermite spraying process of: preparing a thermal spray material comprising, as main components, a refractory raw material powder and a metal powder; spraying the thermal spray material to a target surface (a surface to be repaired), using oxygen or oxygen-containing gas as a carrier gas, and melt-adhering the sprayed thermal spray material to the target surface based on heat generated by combustion of the metal powder.

The thermal spraying material for use in the thermite spraying process comprises a metal powder, as just mentioned, so that there inevitably arises a problem that firing is more likely to occur. Therefore, the following Patent Document 1 proposes a firing prevention technique from a viewpoint of a configuration of a thermal spraying apparatus. However, as long as the thermal spray material itself has a firing property, the firing prevention measure only from the viewpoint of a configuration of a thermal spraying apparatus is not sufficient, and a technique for suppressing the firing property of the thermal spray material itself is desired.

As means to suppress the firing property of the thermal spray material, there has been known a technique of using, as a main component thereof, a metal Si powder having a relatively low firing property as compared to other metal powders such as an Al—Mg alloy powder and a Ca—Si alloy powder (as disclosed, for example, in the following Patent Documents 2 and 3).

In addition to the prevention of firing, the thermal spray material is required to suppress dust generation due to the metal powder so as to improve working efficiency and improve bondability (melt-adhering property) so as to perform stable thermal spraying operation with respect to a target surface. As for suppressing dust generation due to the metal powder, the inventors of this application checked the thermal spray material disclosed in the Patent Document 3, in which a metal Si powder contains a fraction having a particle size of 2 μm or less in an amount of 10 mass % or more with respect to the entire metal Si powder. As a result, the inventors found that dust generation due to the metal Si powder notably occurs during thermal spraying operation, causing deterioration in worker's visibility, resulting in significant difficult to continue the thermal spray operation.

CITATION LIST

Parent Document

Patent Document 1: JP 2013-43141A
Patent Document 2: JP 4109663B
Patent Document 3: JP 2005-336001A

SUMMARY OF INVENTION

Technical Problem

The present invention addresses a technical problem of suppressing a firing property and a dust generating property while improving bondability, in a thermal spray material for use in a thermite spraying process.

Solution to Technical Problem

The inventors diligently conducted researches to solve the above technical problem. As a result, firstly, from a viewpoint of preventing firing, the inventors obtained a finding that it is effective to reduce a median size of the metal Si powder. Secondly, from viewpoint of suppressing the dust generation due to the metal Si powder, the inventors obtained a finding that it is effective to reduce the content of the metal Si powder fraction having a particle size of 2 μm or less. Thirdly, from a viewpoint of improving bondability, the inventors obtained a finding about a content of the metal Si powder required for the improvement in bondability, as a result of considering that, if a content of the metal Si powder is excessively low, a required bondability cannot be obtained.

The present invention has been accomplished based on these findings, and provides a thermal spray material comprising a refractory material powder and a metal Si powder and capable of being sprayed onto a target surface using oxygen or oxygen-containing gas as a carrier gas and melt-adhered to the target surface based on heat generated by combustion of the metal Si powder, wherein: the metal Si powder is contained in an amount of 10 to 25 mass % with respect to the entire thermal spray material; the metal Si powder has a median size of 10 μm or less; and the metal Si powder contains a fraction having a particle size of 2 μm or less in an amount of 8 mass % or less with respect to the entire metal Si powder.

Preferably, in the thermal spray material of the present invention, the median size of the metal Si powder is 8 μm or less.

Effect of Invention

The present invention makes it possible to suppress a firing property and a dust generating property while improving bondability, in a thermal spray material for use in a thermite spraying process. Specifically, by setting the median size of the metal Si powder in the thermal spray material to 15 μm or less, it becomes possible to suppress the firing property, and by setting the content of the metal Si powder fraction having a particle size of 2 μm or less to 8 mass % or less with respect to the entire metal Si powder, it becomes possible to suppress the dust generating property. Further, by setting the content of the metal Si powder to 10 mass % or more, it becomes possible to obtain the bondability. In this case, if the content of the metal Si powder is greater than 25 mass %, firing becomes more likely to occur, even though the median size is reduced. Therefore, from the viewpoints of the bondability and the firing property, the content of the metal Si powder needs to be in the range of 10 to 25 mass %.

BRIEF DESCRIPTION OF DRAWINGS

The FIGURE depicts a relationship between a median size of a metal Si powder and an explosion limit concentration, obtained by an experiment conducted by the inventors.

DESCRIPTION OF EMBODIMENTS

Firstly, from a viewpoint of suppressing a firing property of a thermal spray material, the present invention is characterized in that a metal Si powder comprised in a thermal spray material has a median size of 15 μm or less, more limitedly, 10 μm or less.

The FIGURE depicts a relationship between the median size of the metal Si powder and an explosion limit concentration, obtained by an experiment conducted by the inventors. The explosion limit concentration was measured in an oxygen atmosphere, based on JIS Z8818. In a state in which a sample (metal Si powder) was dispersed using an ultrasonic homogenizer, the median size was measured by a laser diffraction particle size analyzer. A central accumulated value (d50) of a cumulative particle size distribution (volumetric distribution) obtained by the measurement is the median size.

It was found that when the median size of the metal Si powder becomes 15 μm or less, the explosion limit concentration rapidly increases, as depicted in the FIGURE, and thereby firing becomes less likely to occur. According to conventional common technical knowledge, when the median size of the metal Si powder is reduced, it is predicted that firing becomes more likely to occur. Thus, in the inventors' experiment, the finding contrary to the prediction has been obtained. This is probably because, when the median size of the metal Si powder becomes 15 μm or less, such a fine metal Si powder is aggregated to form pseudo-particles, so that the particle size thereof becomes apparently larger, and thereby the metal Si powder becomes less active.

In actual thermal spray operation, it is also considered that, when the metal Si powder is being conveyed by a carrier gas, the metal Si powder having a median size of 15 μm or less is aggregated to form pseudo-particles, thereby leading to deterioration in activity thereof and thus suppression of a firing property thereof. On the other hand, deterioration in activity of the metal Si powder during thermal spray operation has an adverse influence on bondability (melt-adhering property) with respect to a target surface. However, the metal Si powder in the present invention originally consists of fine particles having a median size of 15 μm or less. Thus, even though coarse pseudo-particles are formed during conveyance by a carrier gas, they are disaggregated into individual fine metal Si particles due to impact shock caused by spraying (collision) against the target surface, so that activity of the metal Si powder is fully exhibited. As above, in the present invention, the median size of the metal Si powder is set to 15 μm or less. This makes it possible to bring out a kill-two-birds-with-one-stone advantageous effect of being able to suppress the firing property of the thermal spray material and improve the bondability (melt-adhering property) of the thermal spray material with respect to a target surface.

Secondly, from a viewpoint of suppressing a dust generating property of a thermal spray material, the present invention is characterized in that the metal Si powder contains a fraction having a particle size of 2 μm or less in an amount of 8 mass % or less with respect to the entire metal Si powder. This is based on an inventers' new finding that reducing the content of the metal Si powder fraction having a particle size of 2 μm or less is effective in suppress the dust generating property of the thermal spray material. That is, even when the median size of the metal Si powder is reduced, the dust generating property can be suppressed by setting the content of the fraction having a particle size of 2 μm or less to 8 mass % or less.

In the present invention, the metal Si powder is contained in an amount of 10 to 25 mass % with respect to the entire thermal spray material. If the content of the metal Si powder is less than 10 mass %, it becomes impossible to obtain bondability (melt-adhering property) necessary as a thermal spray material. On the other hand, the content of the metal Si powder is greater than 25 mass %, firing is more likely to occur, even though the median size is reduced.

In the thermal spray material of the present invention, the remainder other than the metal Si powder consists primarily of a non-metallic refractory material powder. The non-metallic refractory material powder may be the same material as that of a refractory material powder used in a conventional thermal spray material. Examples thereof include one or a combination of two or more selected from the group consisting of a silica-based powder, a magnesia-based powder, an alumina-based powder, an alumina-silica based powder, a magnesia-silica based powder, an alumina-magnesia based powder, an alumina-spinel based powder, a calcia-based powder, and a calcia-silica based powder. A particle size composition of each of the above refractory material powders may be appropriately adjusted along with a conventional thermal spray material.

In the present invention, the metal Si powder is used as a primary component of a metal powder. In this case, in addition to the above non-metallic refractory material powder, the remainder other than the metal Si powder may comprise a metal powder other than the metal Si powder, such as an Al powder, an Al—Mg alloy powder, a Mg powder, a Fe—Si alloy powder or a Ca—Si alloy powder, wherein this metal powder may be added in a small amount (of up to 1 mass % with respect to the entire thermal spray material) as a combustion aid for improving a heat generating property. An organic-based powder capable of undergoing combustion in an oxygen atmosphere, such as pitch, may further be added to an extent without exerting any influence on physical properties of the thermal spray material (e.g., in an amount of less than 2 mass % with respect to the entire thermal spray material) as an ignition aid.

Examples

Table 1 presents Inventive Examples of a thermal spray material, together with Comparative Examples. In the Examples, a silica-based powder was used as the non-metallic refractory material powder. Examples of the silica-based powder include a natural quartz powder, a fused silica powder, silica sand, a silica rock powder, and a refractory material powder consisting primarily of one or more of them.

TABLE 1

|  |  |  | Inventive Example 1 | Inventive Example 2 | Inventive Example 3 | Inventive Example 4 | Inventive Example 5 | Inventive Example 6 | Inventive Example 7 | Inventive Example 8 | Inventive Example 9 |
|---|---|---|---|---|---|---|---|---|---|---|---|
| Thermal Spray Material | Refractory material powder | Silica-based powder 1-0.5 mm | 40 | 40 | 35 | 35 | 40 | 40 | 35 | 40 | 40 |
|  |  | Silica-based powder 0.5 mm or less | 45 | 50 | 40 | 45 | 50 | 50 | 40 | 45 | 45 |
|  | Metal powder | Metal Si powder (in entire thermal pray material) | 15 | 10 | 25 | 20 | 10 | 10 | 25 | 15 | 15 |
|  |  | Metal Si powder 2 μm or less (in entire thermal pray material) | 3 | 3 | 3 | 3 | 8 | 5 | 8 | 3 | 3 |
|  |  | Median size of metal Si powder (μm) | 6 | 6 | 6 | 15 | 15 | 10 | 10 | 10 | 8 |
| Evaluation |  | Presence or absence of firing | ⊚ | ⊚ | ⊚ | Δ | Δ | ⊚ | ○ | ○ | ⊚ |
|  |  | Bondability with brick after thermal spraying | ⊚ | ⊚ | ⊚ | ○ | Δ | ○ | ⊚ | ○ | ⊚ |
|  |  | Dust generating property | ⊚ | ⊚ | ⊚ | ⊚ | Δ | ○ | ○ | ○ | ⊚ |
|  |  | Comprehensive evaluation | ⊚ | ⊚ | ⊚ | Δ | Δ | ○ | ○ | ○ | ⊚ |

|  |  |  | Comparative Example 1 | Comparative Example 2 | Comparative Example 3 | Comparative Example 4 |
|---|---|---|---|---|---|---|
| Thermal Spray Material | Refractory material powder | Silica-based powder 1-0.5 mm | 45 | 30 | 40 | 40 |
|  |  | Silica-based powder 0.5 mm or less | 50 | 40 | 45 | 45 |
|  | Metal powder | Metal Si powder (in entire thermal pray material) | 5 | 30 | 15 | 15 |
|  |  | Metal Si powder 2 μm or less (in entire thermal pray material) | 3 | 10 | 5 | 5 |
|  |  | Median size of metal Si powder (μm) | 6 | 10 | 20 | 30 |
| Evaluation |  | Presence or absence of firing | ⊚ | X | X | X |
|  |  | Bondability with brick after thermal spraying | X | ○ | Δ | X |
|  |  | Dust generating property | ⊚ | X | ○ | ○ |
|  |  | Comprehensive evaluation | X | X | X | X |

The thermal spray material in each Example was thermally sprayed onto a surface of brick as a target surface. Then, the presence or absence of firing and a dust generation property during the thermal spraying operation, and bondability (melt-adhering property) with the brick after the thermal spraying operation, were evaluated.

A commonly-used thermal spray apparatus was used for the thermal spraying operation, wherein the thermal spray material was extracted by a given amount from a storage tank through a feeder provided at a bottom of the storage tank, and, after being conveyed by oxygen gas, sprayed from a tip of a nozzle toward the brick surface. A supply rate of the thermal spray material (powder) was set to 60 kg/h, and a distance between the brick surface and the nozzle tip was set to 80 mm. Under these conditions, the thermal spray material was sprayed onto the brick surface in an amount of 3 kg per operation.

The evaluation on the presence or absence of firing during the thermal spraying operation was performed such that, after repeating the thermal spraying operation 100 times: when no firing occurred in the operations, the thermal spray material was evaluated as ⊚; when firing occurred in one of the operations, the thermal spray material was evaluated as ○; when firing occurred in two of the operations, the thermal spray material was evaluated as Δ; and when firing occurred in three or more of the operations, the thermal spray material was evaluated as x.

The evaluation on the dust generating property was performed such that, during the thermal spraying operation: when almost no dust generation occurred, and visibility was good, the thermal spray material was evaluated as ⊚; when dust generation slightly occurred, but visibility was good, the thermal spray material was evaluated as ○; when dust generation occurred to cause slight deterioration in visibility, but it did not cause difficulty in continuing the operation, the thermal spray material was evaluated as Δ; and when dust generation occurred to cause deterioration in visibility and thus difficulty in continuing the operation, the thermal spray material was evaluated as x.

The evaluation on the bondability with the brick was performed such that: when a sprayingly deposited material was detached together with the brick as a result of an operation of detaching the deposited material by hammering, the thermal spray material was evaluated as ⊚; when no defect in bonding was observed from external appearance, and the deposited material was peeled off from a bonding interface as a result of the operation of detaching the deposited material by hammering, the thermal spray material was evaluated as ○; when a partially detached portion was observed from the external appearance, the thermal spray material was evaluated as Δ; and when a defect in bonding was significantly observed from the external appearance, the thermal spray material was evaluated as x.

That is, in all of the above evaluations, an evaluation result becomes gradually worse in the following order: ⊚, ○, Δ and x. The comprehensive evaluation was determined based on a worst one of the three evaluations. For example, when ○ was a worst one of the three evaluations, the comprehensive evaluation was determined as ○, and when Δ was a worst one of the three evaluations, the comprehensive evaluation was determined as Δ. Further, when x was a worst one of the three evaluations, the comprehensive evaluation was determined as x. Then, when the comprehensive evaluation was Δ or better, the thermal spray material was evaluated as an acceptable material. On the other hand, when the comprehensive evaluation was x, the thermal spray material was evaluated as a reject material.

Each of Inventive Examples in Table 1 falling within the scope of the present invention was evaluated as Δ or better in the comprehensive evaluation.

On the other hand, Comparative Example 1 is inferior in terms of the bondability with the brick, due to an excessively small content of the metal Si powder. In Comparative Example 2, firing is more likely to occur, due to an excessively large content of the metal Si powder. In Comparative Examples 3 and 4, firing is more likely to occur, due to an excessively large median size of the metal Si powder.

In Table 1, the comprehensive evaluation of each of Reference Examples 4 and 5 in which the metal Si powder thereof has a median size of 15 μm is Δ, whereas the comprehensive evaluation of each of Inventive Examples 6 to 8 in which the metal Si powder thereof has a median size of 10 μm is ○, and the comprehensive evaluation of each of Inventive Examples 1 to 3 and 9 in which the metal Si powder thereof has a median size of 8 μm or less is ⊚. Thus, the median size of the metal Si powder is preferably 10 μm or less, more preferably, 8 μm or less.

Reference Example 5 is an example in which the content of the metal Si powder fraction having a particle size of 2 μm or less is 8 mass % with respect to the entire metal Si powder, wherein the evaluation on the dust generating property is Δ. In Inventive Example 7, wherein the content of the metal Si powder fraction having a particle size of 2 μm or less is 8 mass % with respect to the entire metal Si powder, as with Reference Example 5, the evaluation on the dust generating property is ○. This is because in Inventive Example 7, the content of the metal Si powder is larger than that in Reference Example 5, and thereby the bondability (melt-adhering property) of the thermal spray material becomes higher. On the other hand, in Comparative Example 2, wherein the content of the metal Si powder fraction having a particle size of 2 μm or less is 10 mass % with respect to the entire metal Si powder, the evaluation on the dust generating property is x. In view of the above, in order to suppress a dust generating property of a thermal spray material, the content of the metal Si powder fraction having a particle size of 2 μm or less needs to be 8 mass % or less with respect to the entire metal Si powder.

TABLE 1

| | | | Inventive Example 1 | Inventive Example 2 | Inventive Example 3 | Inventive Example 4 | Inventive Example 5 | Inventive Example 6 | Inventive Example 7 | Inventive Example 8 | Inventive Example 9 |
|---|---|---|---|---|---|---|---|---|---|---|---|
| Thermal Spray Material | Refractory material powder | Silica-based powder 1-0.5 mm | 40 | 40 | 35 | 35 | 40 | 40 | 35 | 40 | 40 |
| | | Silica-based powder 0.5 mm or less | 45 | 50 | 40 | 45 | 50 | 50 | 40 | 45 | 45 |
| | Metal powder | Metal Si powder (in entire thermal pray material) | 15 | 10 | 25 | 20 | 10 | 10 | 25 | 15 | 15 |
| | | Metal Si powder 2 μm or less (in entire thermal pray material) | 3 | 3 | 3 | 3 | 8 | 5 | 8 | 3 | 3 |
| | | Median size of metal Si powder (μm) | 6 | 6 | 6 | 15 | 15 | 10 | 10 | 10 | 8 |
| Evaluation | | Presence or absence of firing | ⊚ | ⊚ | ⊚ | Δ | Δ | ⊚ | ○ | ○ | ⊚ |
| | | Bondability with brick after thermal spraying | ⊚ | ⊚ | ⊚ | ○ | Δ | ○ | ⊚ | ○ | ⊚ |
| | | Dust generating property | ⊚ | ⊚ | ⊚ | ⊚ | Δ | ○ | ○ | ○ | ⊚ |
| | | Comprehensive evaluation | ⊚ | ⊚ | ⊚ | Δ | Δ | ○ | ○ | ○ | ⊚ |

| | | | Comparative Example 1 | Comparative Example 2 | Comparative Example 3 | Comparative Example 4 |
|---|---|---|---|---|---|---|
| Thermal Spray Material | Refractory material powder | Silica-based powder 1-0.5 mm | 45 | 30 | 40 | 40 |
| | | Silica-based powder 0.5 mm or less | 50 | 40 | 45 | 45 |
| | Metal powder | Metal Si powder (in entire thermal pray material) | 5 | 30 | 15 | 15 |
| | | Metal Si powder 2 μm or less (in entire thermal pray material) | 3 | 10 | 5 | 5 |
| | | Median size of metal Si powder (μm) | 6 | 10 | 20 | 30 |
| Evaluation | | Presence or absence of firing | ⊚ | X | X | X |
| | | Bondability with brick after thermal spraying | X | ○ | Δ | X |
| | | Dust generating property | ⊚ | X | ○ | ○ |
| | | Comprehensive evaluation | X | X | X | X |

The invention claimed is:

1. A thermal spray material comprising a refractory material powder and a metal Si powder, the thermal spray material sprayable onto a target surface using oxygen or oxygen-containing gas as a carrier gas and melt-adhereable to the target surface based on heat generated by combustion of the metal Si powder, wherein the metal Si powder is contained in an amount of 10 to 25 mass % with respect to the entire thermal spray material, and wherein the metal Si powder has a median size of 10 μm or less, and contains a fraction having a particle size of 2 μm or less in an amount of 8 mass % or less with respect to the entire metal Si powder.

2. The thermal spray material as recited in claim 1, wherein the median size of the metal Si powder is 8 μm or less.

* * * * *